United States Patent [19]
Reynolds

[11] 3,748,435
[45] July 24, 1973

[54] WIRE ATTITUDE CONTROL
[75] Inventor: Richard W. Reynolds, Hazelcrest, Ill.
[73] Assignee: Welding Research, Inc., Chicago, Ill.
[22] Filed: Dec. 16, 1971
[21] Appl. No.: 208,582

[52] U.S. Cl..................... 219/130, 72/138, 226/180
[51] Int. Cl............................................ B21f 23/00
[58] Field of Search...................... 72/135, 138, 145; 219/130; 226/180

[56] References Cited
UNITED STATES PATENTS
3,567,900  3/1971  Nelson et al......................... 219/130
3,172,991  3/1965  Arnoldy.............................. 219/130
3,401,557  9/1968  Platt..................................... 72/135

Primary Examiner—Lowell A. Larson
Attorney—Julius L. Solomon

[57] ABSTRACT

A wire feed apparatus for use in conjunction with the gas metal arc welding process. The apparatus includes means for pulling the consummable electrode wire from a reel, a means for giving the wire a radius of curvature and means for controlling the attitude of the wire as it is fed to the work area. The attitude is adjusted by means of a skew adjustment on one of the drive wheels which causes the wire to be delivered at a controllable angle to either side of the plane passing through the arc over which the wire has been bent.

4 Claims, 7 Drawing Figures

INVENTOR.
RICHARD W. REYNOLDS
BY Julius I. Solomon

WIRE ATTITUDE CONTROL

This invention relates to apparatus used in conjunction with the gas metal arc welding process. The gas metal arc welding process is an arc welding process wherein coalescence is produced by heating with an electric arc between a consummable filler metal electrode and the work.

In this process the consummable electrode is in the form of a wire which may have a diameter from 20 thousandths of an inch to one eighth of an inch. The wire is continuously fed from a wire reel and is fed from thereby means of a wire drive through the electrode holder which also guides a shielding gas to the work area so as to prevent oxidation of the metal in the area being welded. During the welding process it is necessary that the wire be directed properly to the exact spot at which the welding is desired. In certain cases where the weld metal is to be deposited in a narrow slot formed between two thick metal plates which are to be welded, it is necessary that the wire as it is fed into the work area be given a cant so that it is directed along a given arc and at a certain attitude so that an arc is formed between the wall represented by the edge of one of the plates and the wire at a desired point or along a desired line as the work is moved with respect to the electrode holder. The present invention concerns an improved device for the control of the wire being fed while performing the gas metal arc welding process.

The object of the present invention is to allow for the realization of a wire feeding apparatus by which the wire may be positively steered to a desired point.

Another object is to capture the attitude of any bend or cast in the wire as it pays off the storage reel.

Another object is to bend or cast the wire into a controlled diameter of bend.

Another major objective of the invention is to steer the attitude or direction of bend of the wire being fed to the welding area with relation to the center line of the wire transport system after it leaves the driving rolls.

Another object is to provide a device by which the radius and attitude of the wire may easily be adjusted and controlled.

An ancillary object is to provide an apparatus which may be used either to straighten wire or to impart to the wire a desired radius and attitude.

The figures attached to the specification illustrate one form which the invention may take.

Figure 1:
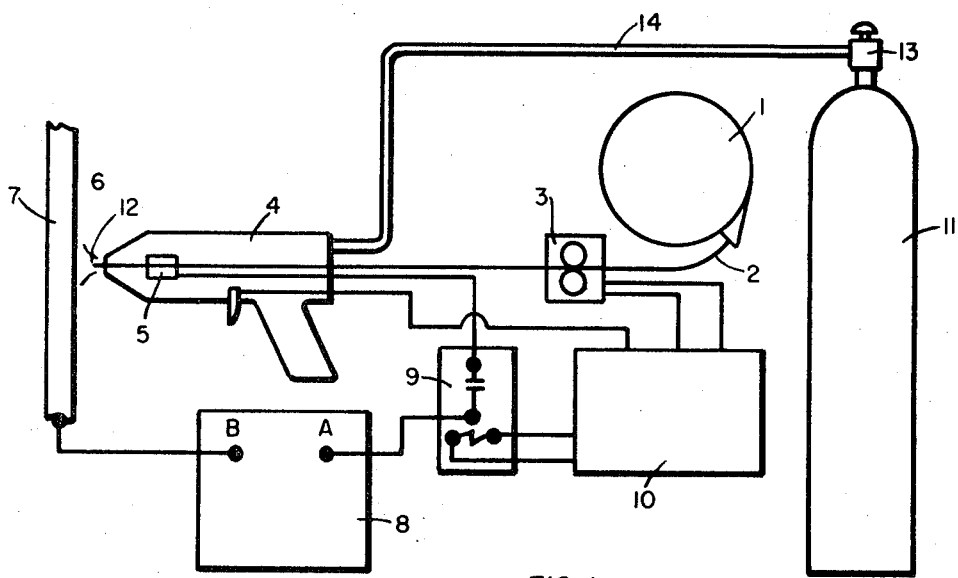
FIG. 1 is a drawing in schematic form showing the various parts of a gas metal arc consumable electrode process.

Referring to FIG. 1 which is a schematic diagram illustrating the gas metal arc process, we may note the wire reel 1 upon which is wound up wire 2 which is a material which is compatible to the material being welded. The wire is pulled from the wire reel and fed to the work area through the electrode holder 4. The wire drive 3 may be mounted on the electrode holder or at the wire reel and the electrode holder, in the case of an automatic welding machine, would be mounted on a carriage which would move the electrode holder in the proper relation to the material to be welded. The wire passes through the electrode holder and by means of contact tube 5 current from the power supply 8 passes from terminal A of the power supply through contactor 9 when the said contactor 9 is energized through the contact tube 5, through that portion of the wire 2 between the contact 2 and the work piece 7 and returning through the work piece to terminal B of the power supply. Shielding gas is fed from the gas supply 11 through gas flow regulator 13, through tubing 14, through the electrode holder to the area surrounding the point at which the welding is being performed (6). The heat to perform the welding operation is derived from the arc which forms between the end 12 of the wire 2 and the work piece 7, the arc being sustained by the current supplied by the power supply 8 when the contactor 9 is energized. Suitable controls 10 are utilized which govern the rate at which wire is fed from the wire reel and control the current, gas flow and cooling of the electrode, if such is required. In the past, wire feed devices of a simple nature have been used whose function was to pull the wire from the reel and to feed it to the welding area as the metal was being melted by the arc and deposited along the seam being welded. These prior systems, however, have been found to be unsatisfactory when the gas metal arc process is utilized in automatic equipment for the welding of continuous seams as used in the manufacture of wheels or when it is desired to form a weld between two thick plates. In the first mentioned it is necessary that the wire be directed always to the seam along the line of adjoinment of the parts being welded. In the welding of thick plates it is necessary that the wire be directed toward the bottom of the wall formed by the edge of one of the plates being welded. In this case a second torch may be utilized to direct a second wire to the wall formed by the second plate being welded to the first. It is necessary, in such cases, not only to bend the wire so that it has a very definite radius, but also to control it in such a way that it has a definite attitude.

Figure 2:
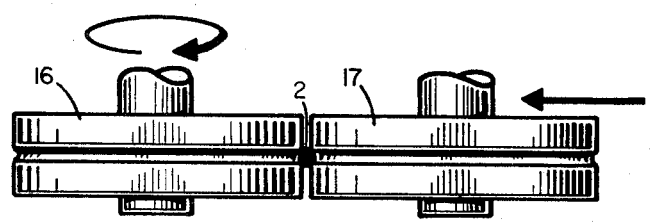
FIG. 2 is a detail of the means utilized to drive the wire.

In the apparatus made in accordance with the present invention, the attitude of the bend or cast in the original wire as it leaves the wire reel is captured by a transport tube which is curved to the shape of the wire and is placed between the wire reel 1 and the wire drive shown in FIG. 2. Any curvature in the original wire as it is fed from the wire reel will align itself with the curve in the transport tube so that the cast is in a uniform or constant angle entering the feed drive.

Figure 3:
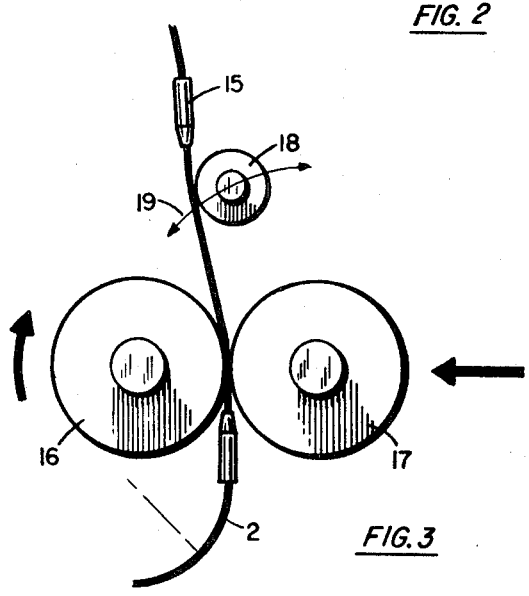
FIG. 3 illustrates the method by which the wire is given a desired radius of curvature.

The wire drive shown in FIG. 2 consists of a driven feed roll 16 with a free turning pressure roll 17 operating against the drive roll 16. The wire is gripped between these two rolls under pressure by a force which may be provided by either springs or hydraulic or pneumatic cylinders. There is a groove in one of the rools to keep the wire tracking through the system and to maintain the position of the wire with respect to the drive rolls. This groove allows the wire to protrude out of the surface of the roll so that the wire may be in contact with the surface of the second roll and thus be gripped and prevented from slipping. The pressure roll 17 may also be grooved if it is desired to make the adjustment more sensitive. The wire is given the desired radius by a bending system placed between the transport tube and the wire drive rolls as shown in FIG. 3. A grooved roller 18 is mounted and arranged so that it bends the wire around one of the drive rolls. The degree of this bend is adjusted by moving the grooved wire bending roller 18 to a desired point along an arc (19) which lies on a plane normal to the axis of the drive wheel 16 and passing through the wire. The position of the adjustment roll 18 along this arc controls the radius of curvature of the wire as it comes through the feed rollers.

Figure 4:
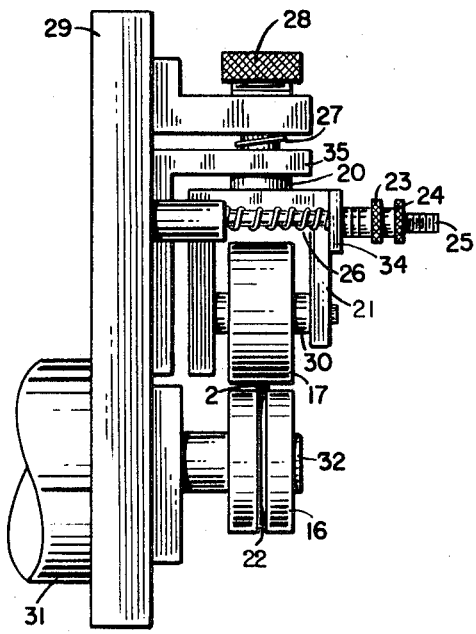
FIG. 4 is a side elevation of a wire feed made in accordance with the invention.
Figure 4A:
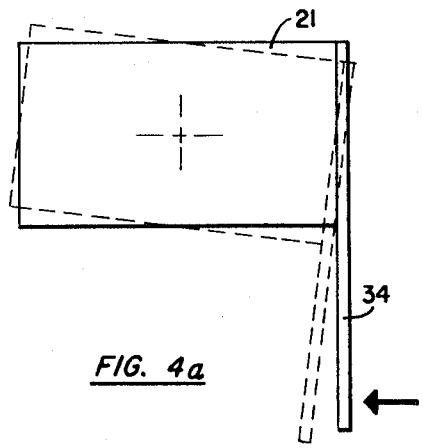
FIG. 4A is a top view of the support for one of the wire drive rolls.
Figure 4B:
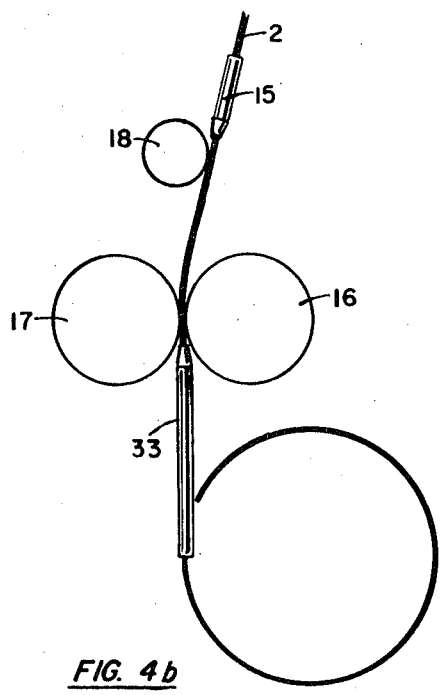
FIGS. 4B and 4C illustrate the change in attitude of the wire caused by a change in the position of one of the wire drive rolls.
Figure 4C:
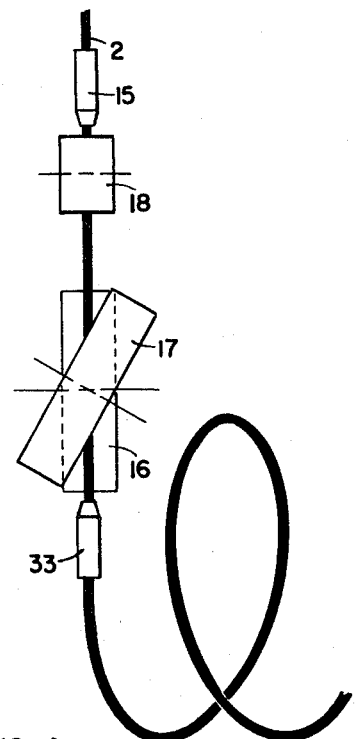

FIG. 4 is a side view of a practical realization of the wire feed mechanism of the present invention. Drive motor 31 mounted on supporting member 29 drives wire feed roll 16 by means of drive shaft 32. The wire 2 is guided by groove 22 in drive wheel 16 and is held under the pressure roller 17. The force exerted upon the wire by the two rollers 16 and 17 is effected by means of spring 27 whose tension may be adjusted by means of a screw and knurled knob 28. The pressure roll 17 is free to turn on shaft 30 which is supported by frame 21 which, in turn, is supported by shaft 20 whose axis is at right angles to the wire so that the frame 21 may rotate with respect to support 35. Frame 21 may be angularly displaced about this axis by means of the knurled nut 23 engaged in threaded shaft 25 which is fixed at one end to the support 29. Shifting the position of the nut 23 will shift the position of the arm 34 which is attached to frame 21 as is indicated by the dotted lines shown in FIG. 4A. Lock nut 24 is utilized to fix the position of nut 23. A shift in the angular position of the support 21 will create a skew in one direction or the other between the drive roller 16 and the pressure roller 17. When the drive wheels 16 and 17 are aligned so that they describe circles which lie in the same plane, the wire 2 will be fed through the rollers and will take an attitude which is in the plane which passes through the smallest diameter of the groove 22 with the radius of the wire being controlled by the position of roller 18. With the pressure roller skewed as is indicated in 4C the wire will leave the wire guide 33 with radius given to it depending upon the position of roller 18 but with an attitude towards the right so that the wire will form a helix which moves towards the right. If the pressure roller 17 is skewed in the counterclockwise direction the wire will leave the guide 33 at the same radius but will be cast towards the left so that it forms a helix moving in that direction. The attitude control system is effected in a stepless controllable manner by means of the screw and nut arrangement shown in FIG. 4. In practical operation the skew relationship between the two rollers is adjusted until the wire curvature put in by the bending roller 18 is in line with the bend direction as indicated above. A change in the skew angle will cause the attitude of the wire cast to rotate with respect to the bending direction. The bend radius adjustment and the attitude adjustment function independently of one another.

It has also been found that wire which is curved may be straightened by feeding the wire in the reverse direction through the device. This gives the device the greatest utility since the one device may be used as a wire feed to impart to the wire a definite radius and attitude or as a wire straightener.

What I claim is:

1. In a method of feeding and forming wire from a reel for use in the gas metal arc welding process, the steps of guiding the wire from the reel to the position where it is to be formed, passing the wire over an arcuate portion of a grooved drive wheel so as to bend it to a desired radius, passing the wire between said drive wheel and a skewable idler wheel while force is applied between diametrically opposed points on the periphery of the said wire so as to impart to the already curved wire a desired angular attitude away from either side of the plane containing the wire as it passes over the said grooved drive wheel and passing the said wire through a contactor tube which guides the wire to the welding position and establishes contact with the wire for connection to a welder power supply.

2. A wire feeding and forming apparatus for use in practicing the gas metal arc welding process comprising, means for guiding the wire from a reel to the position where it is to be formed, drive means for pulling the said wire from the reel, the said drive means comprising a wheel machined with a groove along its circular periphery for locating the said wire, means for varying the arc over which the wire makes contact with the said wheel, an idler wheel rotatable essentially in a plane passing through the said groove, means for skewing the said idler wheel with respect to the said drive wheel, and means for applying force across the section of wire between the said drive wheel and the said idler wheel, and means for guiding the wire to the work area and establishing and maintaining sliding electrical contact with the said wire.

3. An apparatus as in claim 2 in which the said means for pulling the said wire from the reel comprises a pair of drive wheels in closest proximity at their periphery mounted on shafts which are substantially parallel and means for rotating one of said shafts about an axis passing diametrically through both wheels along the center of their width.

4. An apparatus as in claim 3 in which at least one of the said wheels is formed along the center of its width with a peripheral groove for locating the wire.

* * * * *